(12) United States Patent
Noda et al.

(10) Patent No.: US 7,711,228 B2
(45) Date of Patent: May 4, 2010

(54) TWO-DIMENSIONAL PHOTONIC CRYSTAL AND OPTICAL DEVICE USING THE CRYSTAL

(75) Inventors: Susumu Noda, Kyoto (JP); Takashi Asano, Kyoto (JP); Hitoshi Kitagawa, Ota-ku (JP); Seiichi Takayama, Chuo-ku (JP)

(73) Assignees: Kyoto University, Kyoto (JP); Alps Electric Co., Ltd., Tokyo (JP); TDK Corporation, Tokyo (JP)

( * ) Notice: Subject to any disclaimer, the term of this patent is extended or adjusted under 35 U.S.C. 154(b) by 0 days.

(21) Appl. No.: 11/661,232
(22) PCT Filed: Aug. 30, 2005
(86) PCT No.: PCT/JP2005/015691

§ 371 (c)(1),
(2), (4) Date: May 21, 2007

(87) PCT Pub. No.: WO2006/025343

PCT Pub. Date: Mar. 9, 2006

(65) Prior Publication Data

US 2008/0013902 A1    Jan. 17, 2008

(30) Foreign Application Priority Data

Aug. 30, 2004   (JP)   ............... 2004-249582

(51) Int. Cl.
*G02B 6/10*    (2006.01)
(52) U.S. Cl. ..................................... 385/129
(58) Field of Classification Search ............. None
See application file for complete search history.

(56) References Cited

U.S. PATENT DOCUMENTS 5,406,573 A * 4/1995 Ozbay et al. ............. 372/43.01

(Continued)

FOREIGN PATENT DOCUMENTS

JP    2000-258645    9/2000

(Continued)

OTHER PUBLICATIONS

J. Takeda et al. Formation of Al(x)Ga(1-x)As periodic array of micro-hexagonal pillars and air holes by selective area MOVPE. Applied Surface Science 190, pp. 236-241, May 2002.*

(Continued)

*Primary Examiner*—Mike Stahl
(74) *Attorney, Agent, or Firm*—Oliff & Berridge, PLC

(57) ABSTRACT

The present invention intends to provide a two-dimensional photonic crystal having a wide photonic band gap (PBG). In a slab-shaped body 31, a number of holes 32, whose sectional shape on a plane parallel to the slab surface is an equilateral triangle, are periodically arranged in a triangular lattice pattern. The upper and lower sides of the holes 32 are covered with the material of the body 31. The aforementioned sectional shape is uneven along the direction perpendicular to the slab surface. This construction expands the PBG for TM-polarized light and thereby increases its energy region overlapping with the PBG for TE-polarized light. This overlapping section is the complete PBG. If a ray of light whose wavelength corresponds to an energy level within the complete PBG, neither the TE-polarized nor TM-polarized component of the light can be propagated through the photonic crystal. Therefore, even if a waveguide and/or a resonator is provided in the photonic crystal, the light having the aforementioned wavelength will never leak from the waveguide or resonator into the photonic crystal.

10 Claims, 6 Drawing Sheets

U.S. PATENT DOCUMENTS

| | | | |
|---|---|---|---|
| 5,987,208 A * | 11/1999 | Gruning et al. | 385/146 |
| 6,738,551 B2 | 5/2004 | Noda et al. | |
| 7,050,233 B2 * | 5/2006 | Nikolov et al. | 359/494 |
| 7,272,290 B2 * | 9/2007 | Sugita et al. | 385/129 |
| 7,349,612 B2 * | 3/2008 | Nishii et al. | 385/129 |
| 2002/0009277 A1 | 1/2002 | Noda et al. | |
| 2003/0020501 A1 * | 1/2003 | Aoki et al. | 324/754 |
| 2004/0008945 A1 | 1/2004 | Sigalas | |
| 2004/0008962 A1 | 1/2004 | Sigalas et al. | |
| 2005/0047742 A1 * | 3/2005 | Kitagawa et al. | 385/129 |
| 2005/0285115 A1 * | 12/2005 | Nakagawa et al. | 257/76 |
| 2006/0104586 A1 * | 5/2006 | Tokushima | 385/129 |

FOREIGN PATENT DOCUMENTS

| | | |
|---|---|---|
| JP | 2001-272555 | 10/2001 |
| JP | A-2002-84037 | 3/2002 |
| JP | 2004-46181 | 2/2004 |
| JP | 2004-125919 | 4/2004 |
| JP | 2004-294517 | 10/2004 |

OTHER PUBLICATIONS

C. Jamois et al. Silicon-based photonic crystal slabs: two concepts. IEEE Journal of Quantum Electronics 38:7:805-810, Jul. 2002.*

H. Kitagawa et al., "Absolute Photonic Bandgap in Two-Dimensional Photonic Crystal Slabs", Preprints of the 50$^{th}$ Joint Symposia on Applied Physics, Japan Society of Applied Physics, Mar. 2003, p. 1129.

S. Takayama et al., "Experimental Demonstration of Complete Photonic Bandgap in 2D Photonic Crystal Slab", 2004 Nen Shunki Dai 51 Kai Oyo Butsurigaku Kankei Rengo Koenkai Koen Yokoshu, vol. 3, Mar. 2004, p. 1169.

* cited by examiner

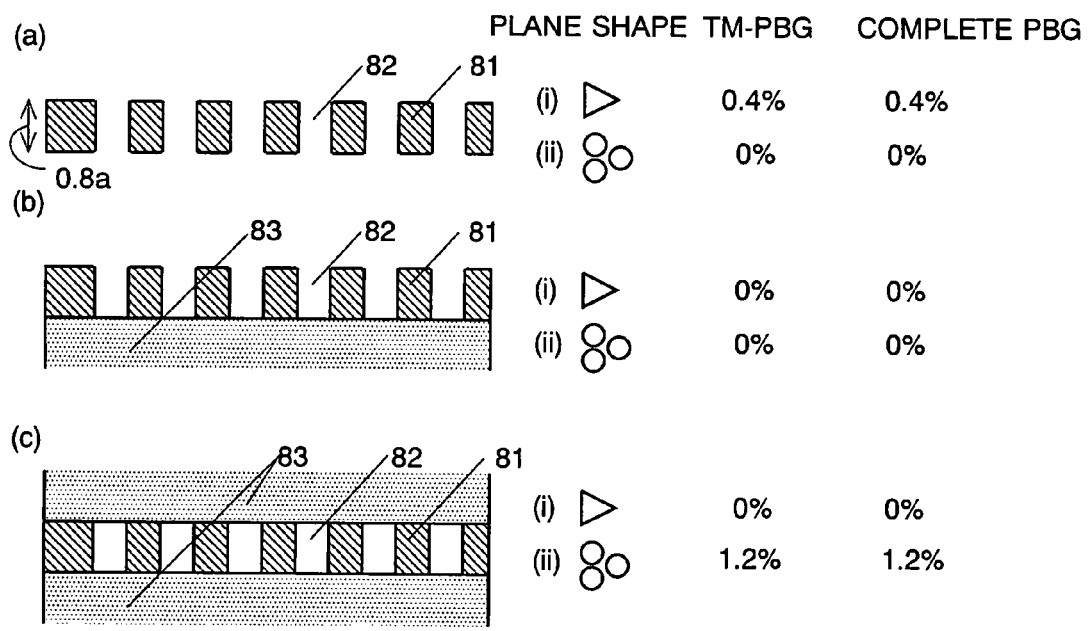
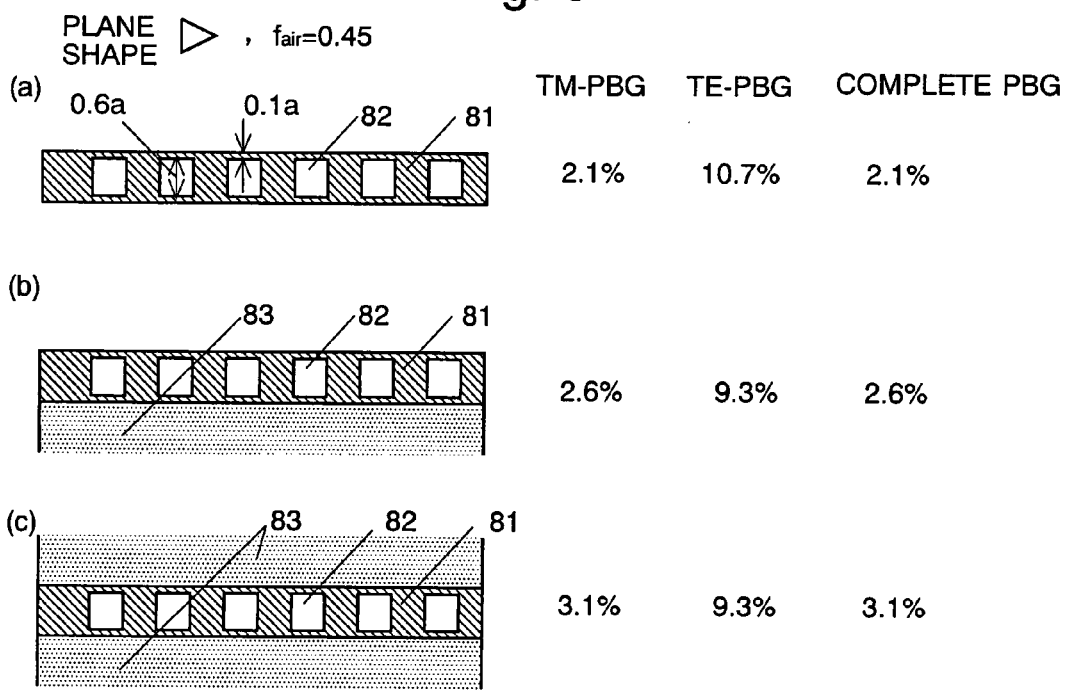

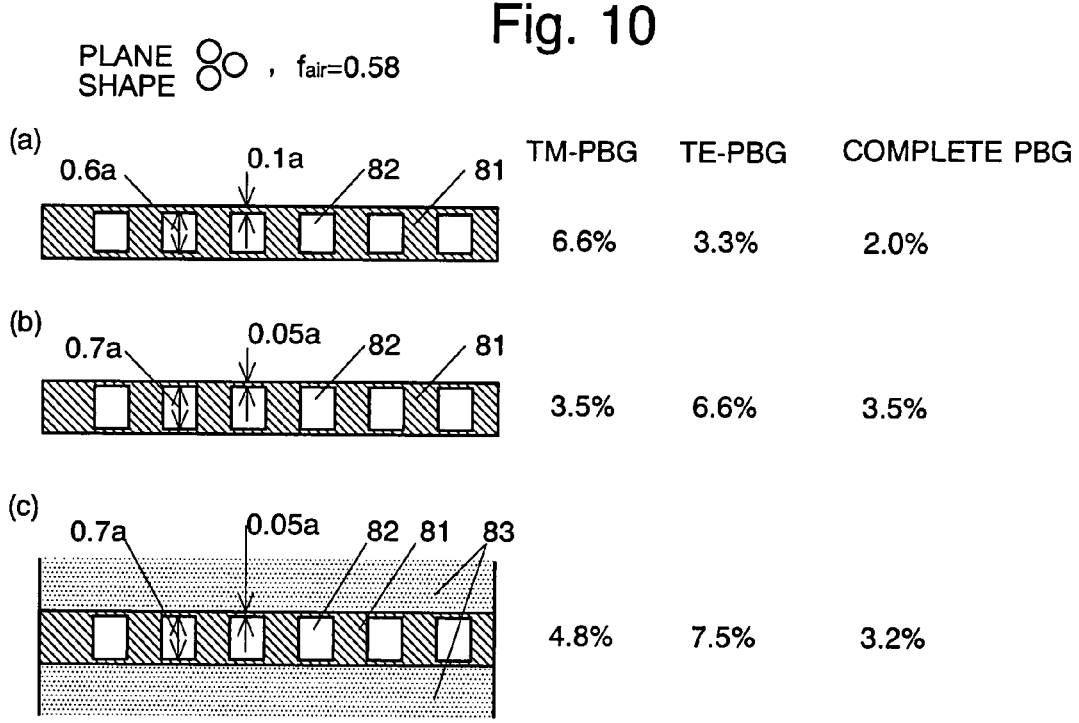
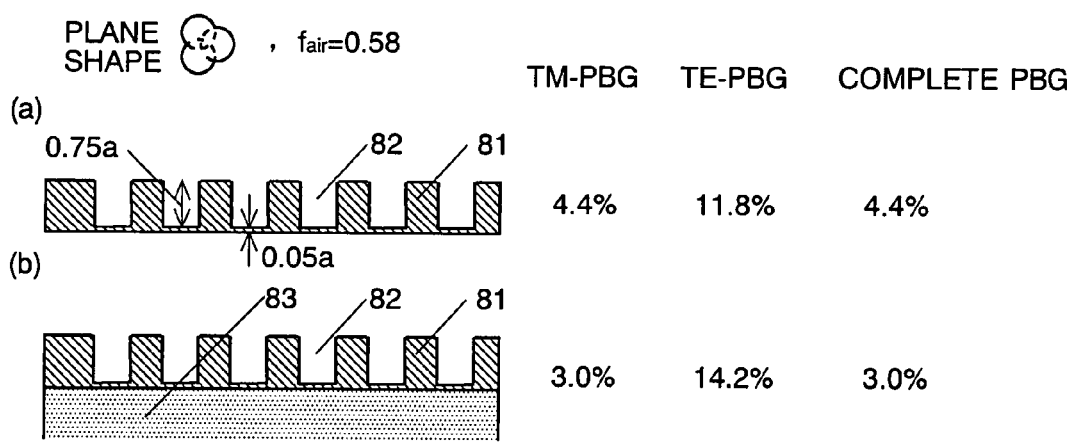

TWO-DIMENSIONAL PHOTONIC CRYSTAL AND OPTICAL DEVICE USING THE CRYSTAL

TECHNICAL FIELD

The present invention relates to a two-dimensional photonic crystal used as an optical multiplexer/demultiplexer or other kinds of devices in wavelength division multiplexing (WDM) communication or other techniques. It should be noted that the term "light" or "optical" used in this patent application includes electromagnetic waves in general as well as visible light.

BACKGROUND ART

Optical communication is a technique that could play a central role in future broadband communications. For widespread use of the optical communication, the optical components used in optical communication systems are required to be higher in performance, smaller in size and lower in price. Optical communication devices using photonic crystals are one of the leading candidates for the next-generation optical communication components that satisfy the aforementioned requirements. Some of these devices have already been put into practical use, an example of which is a photonic crystal fiber for polarization dispersion compensation. Furthermore, recent efforts have had a practical goal of developing optical multiplexers/demultiplexers and other devices that can be used in wavelength division multiplexing.

A photonic crystal is a dielectric object having an artificial periodic structure. Usually, the periodic structure is created by providing the dielectric body with a periodic arrangement of modified refractive index areas, i.e. the areas whose refractive index differs from that of the body. Within the crystal, the periodic structure creates a band structure with respect to the energy of light and thereby produces an energy region in which the light cannot be propagated. Such an energy region is called the "photonic band gap (PBG)". The energy region (or wavelength band) at which the PBG is created depends on the refractive index of the dielectric body and the period of the periodic structure.

Introducing an appropriate defect into the photonic crystal creates a specific energy level within the PBG ("defect level"), and only a ray of light having a wavelength corresponding to the defect level is allowed to be present in the vicinity of the defect. This means that a photonic crystal having such a defect will function as an optical resonator that resonates with light having a specific wavelength. Furthermore, forming a linear defect will enable the crystal to be used as a waveguide.

As an example of the above-described technique, Patent Document 1 discloses a two-dimensional photonic crystal having a body (or slab) provided with a periodic arrangement of modified refractive index areas, in which a linear defect of the periodic arrangement is created to form a waveguide and a point-like defect is created adjacent to the waveguide. This two-dimensional photonic crystal functions as the following two devices: a demultiplexer for extracting a ray of light whose wavelength equals the resonance frequency of the resonator from rays of light having various wavelengths and propagated through the waveguide and for sending the extracted light to the outside; and a multiplexer for introducing the same light from the outside into the waveguide.

Including the one disclosed in Patent Document 1, many two-dimensional photonic crystals are designed so that the PBG becomes effective for either a TE-polarized light, in which the electric field oscillates in the direction parallel to the body, or a TM-polarized light, in which the magnetic field oscillates in the direction parallel to the body. According to this design, if a ray of light containing both kinds of polarized light is introduced into the waveguide or resonator of the two-dimensional photonic crystal, the propagating efficiency of the waveguide deteriorates, since one of the two kinds of polarized light diffuses within the crystal body. For example, if the periodic structure has a triangular lattice pattern and each modified refractive index area is circular (or cylindrical), the PBG will be effective for only the TE-polarized light. A waveguide or resonator formed in this two-dimensional photonic crystal causes negligible loss of TE-polarized light. However, it allows the TM-polarized light to freely propagate through the body and be lost, because no PBG is created for the TM-polarized light.

Taking the above problem into account, studies have been conducted on a new design of two-dimensional photonic crystal having a PBG for each of the TE-polarized light and the TM-polarized light in which the two PBGs have a common band. This band is called a "complete photonic band gap (complete PBG)" hereinafter. For example, FIG. 1 is a plan view of a two-dimensional photonic crystal disclosed in Non-Patent Document 1, which has a complete PBG created by periodically arranging triangular (or triangle-pole-shaped) holes 12 in a triangular lattice pattern in the slab 11. Within this two-dimensional photonic crystal, neither the TE-polarized light nor the TM-polarized light can leak from the waveguide, resonator or other device into the body as long as the wavelength of the light is within the complete PBG. Therefore, the propagating efficiency is maintained.

[Patent Document 1] Unexamined Japanese Patent Publication No. 2001-272555 ([0023]-[0027], [0032], FIGS. 1, and 5-6)

[Non-Patent Document 1] Hitoshi KITAGAWA et al. "Nijigen Fotonikku Kesshou Surabu Ni Okeru Kanzen Fotonikku Bando Gyappu ("Absolute Photonic Bandgap in Two-Dimensional Photonic Crystal Slabs)", Preprints of the 50th Joint Symposia on Applied Physics, Japan Society of Applied Physics, March 2003, p. 1129

DISCLOSURE OF THE INVENTION

Problem to be Solved by the Invention

A wider complete PBG will effectively provide a higher degree of freedom for designing optical devices. For example, it is easier to adjust the transmission wavelength band of the waveguide and the resonance frequency of the resonator under the condition that neither TE nor TM polarized light is prevented from leaking into the body. As mentioned earlier, efforts have been made to create a two-dimensional photonic crystal having a complete PBG. However, none of them has succeeded in creating a complete PBG having an adequately large width.

Accordingly, an objective of the present invention is to provide a two-dimensional photonic crystal having a complete PBG whose width is larger than that of conventional two-dimensional photonic crystals. Another objective is to provide an optical device using such a two-dimensional photonic crystal.

Means for Solving the Problems

To achieve the above-described objectives, the present invention provides a two-dimensional photonic crystal having a slab-shaped body with a periodic arrangement of modified refractive index areas, which are identically shaped and whose refractive index is different from that of the body, which is characterized in that:

the pattern of lattice points at which the modified refractive index areas are located is 6 mm-symmetrical; and the cross-section of the modified refractive index areas on a plane parallel to the body has a 3 m-symmetrical shape, and this shape unevenly changes along the direction perpendicular to the body.

The boundary line of the cross-section of the modified refractive index area on a plane perpendicular to the body may be convex, concave, crank-shaped or linearly inclined on the side facing the perpendicular central line of the modified refractive index area, or a combination of two or more of these shape elements. One or both of the upper and lower sides of the modified refractive index areas may be closed.

One or both of the upper and lower sides of the body may be in contact with a cladding member whose refractive index differs from that of the body. The cladding member can be made of a material whose refractive index is higher than that of air and lower than that of the material of the body. For example, if the body is made of silicon (Si), the cladding member may be made of silicon dioxide ($SiO_2$).

It is preferable that each modified refractive index area is a hole.

The present invention also provides an optical waveguide device including a two-dimensional photonic crystal according to the present invention in which a linear defect of the modified refractive index areas is created.

The present invention also provides an optical resonator device including a two-dimensional photonic crystal according to the present invention in which a point-like defect of the modified refractive index areas is created.

The present invention also provides an optical multiplexer/demultiplexer, including:

a two-dimensional photonic crystal according to the present invention;

at least one optical waveguide including a linear defect of the modified refractive index areas created in the two-dimensional photonic crystal; and at least one optical resonator including a point-like defect of the modified refractive index areas created in the vicinity of the optical waveguide.

The present invention also provides a method for manufacturing a two-dimensional photonic crystal including a slab-shaped body having a periodic arrangement of holes, which includes the steps of:

forming holes in the body; and adhering a plate member having the same refractive index as that of the body, onto one or both of the upper and lower sides of the body on which the holes are present.

It should be noted that the words "upper" and "lower" used in this specification do not literally specify the orientation of the body and the modified refractive index areas of the two-dimensional photonic crystal; these words are merely used as the identifiers of the two sides.

BRIEF DESCRIPTION OF THE DRAWINGS

FIG. 8 shows the results of calculations of the complete PBG of two-dimensional photonic crystals as comparative examples.

FIG. 9 shows the results of calculations of the complete PBG of two-dimensional photonic crystals according to the present embodiment.

FIG. 10 shows the results of calculations of the complete PBG of two-dimensional photonic crystals according to the present embodiment.

FIG. 11 shows the results of calculations of the complete PBG of two-dimensional photonic crystals according to the present embodiment.

EXPLANATION OF NUMERALS 11, 21, 31, 81 . . . Body
12, 32, 54$a$, 54$b$, 54$c$, 56, 82 . . . Hole
22 . . . Section of Body 21 in Plane Direction
23, 55 . . . Modified Refractive Index Area
24 . . . Section of Modified Refractive Index Area 23 on Sectional Plane 22
25 . . . Plane Perpendicular to Body 21
26 . . . Boundary Line of Modified Refractive Index Area 23 on Plane 25
40 . . . SOI Substrate
41, 46 . . . $SiO_2$ Substrate
42, 47 . . . Si Thin Film
43 . . . Resist
48 . . . Two-Dimensional Photonic Crystal
51 . . . Lattice Point
83 . . . Cladding Member

MODES FOR CARRYING OUT THE INVENTION AND THEIR EFFECTS

The two-dimensional photonic crystal according to the present invention is characterized by the shape of its modified refractive index areas and their periodic arrangement pattern. With respect to the use of a slab-shaped body with a periodic arrangement of modified refractive index areas whose refractive index differs from that of the body, the present invention is similar to some of the conventional two-dimensional photonic crystals, such as the ones disclosed in Patent Document 1. In a method for creating the modified refractive index areas, certain members whose refractive index differs from that of the body may be embedded into the body. Another possible method is to create holes in the body. The latter method is more preferable because holes are easier to create and the difference in refractive index between the holes and the body can be adequately large.

The shape of the modified refractive index areas is explained. In the following description, the direction parallel to the body is called the plane direction, and the thickness direction of the body is called the vertical direction. The plane shape of the modified refractive index areas should have a symmetrical shape that has a trigonal axis and a vertical symmetry plane including the axis. This symmetry can be expressed as "3 m" in Hermann-Mauguin notation, which is the international notation, or "C3v" in Schoenflies notation. Examples of plane shapes having these kinds of symmetry include a triangle, a group of three pieces of circular modified refractive index areas each having its center located at each apex of an equilateral triangle, and other shapes.

Figure 1:
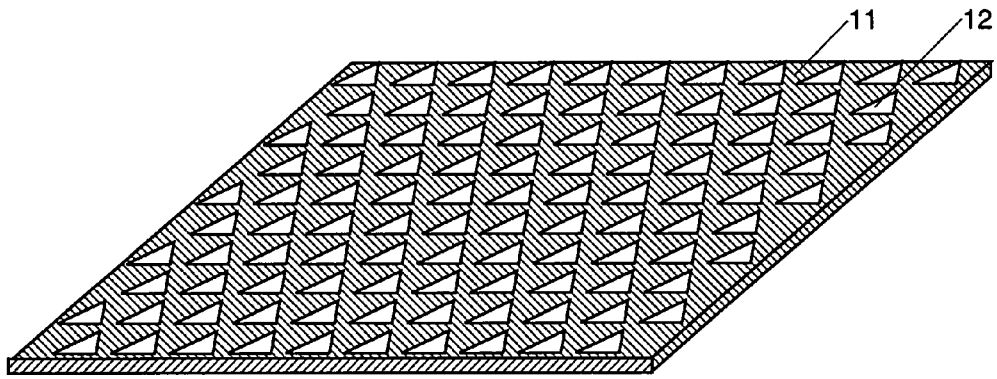
FIG. 1 is a perspective view of a conventional two-dimensional photonic crystal consisting of a slab-shaped body having a periodic arrangement of holes that are shaped like a triangular column.
Figure 2:
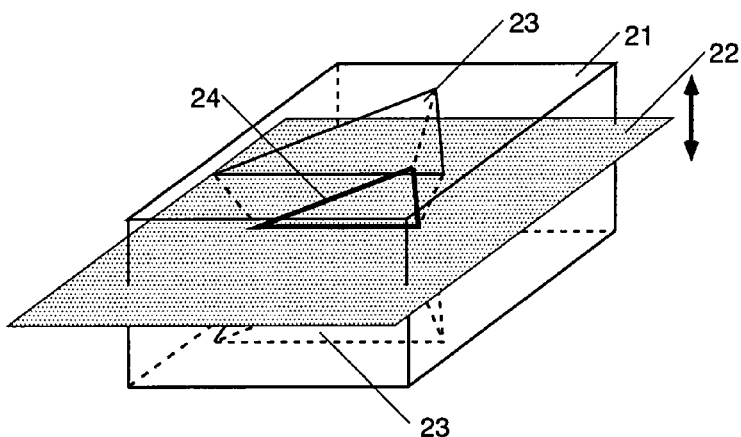
FIG. 2 illustrates how a modified refractive index area according the present invention is shaped.
Figure 3:
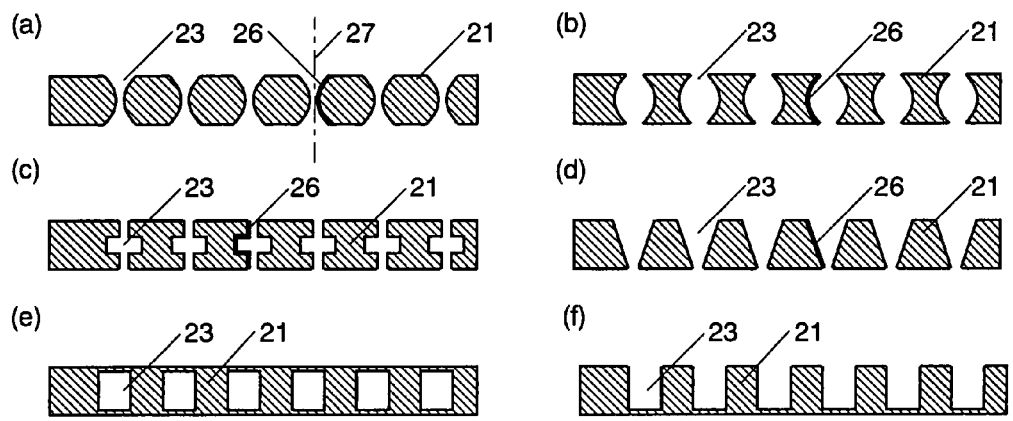
FIG. 3 shows several examples of the modified refractive index area according the present invention having different shapes.
Figure 4:
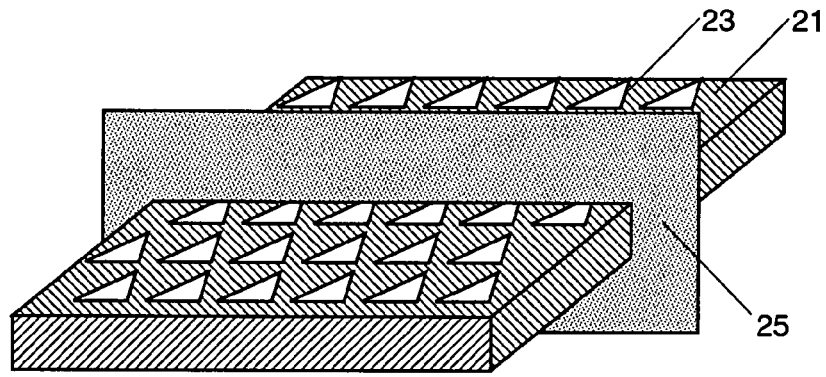
FIG. 4 is a perspective view of a sectional plane for illustrating the shape of the modified refractive index areas.

The plane shape of the modified refractive index areas unevenly changes along the vertical direction. That is, as shown in FIG. 2, the section 24 of the modified refractive index area 23 on a plane 22 sectioning the body 21 parallel to the plane direction changes its shape if the plane 22 is shifted along the vertical direction. FIGS. 3(a) to 3(f) show examples of the shape change. In FIG. 3(a), the boundary line 26 of the modified refractive index area on a section taken at a plane 25 (FIG. 4) perpendicular to the body 21 is convex on the side facing the vertical center line 27 of the modified refractive index area 23. It is concave in (b), crank-shaped in (c) and linearly inclined in (d). Both upper and lower sides of the modified refractive index areas may be closed as in FIG. 3(e). Only one of the upper and lower sides of the modified refractive index areas may be closed, as in FIG. 3(f).

The periodic arrangement of the large number of the modified refractive index areas provided in the body is designed so that the arrangement of the lattice points at which the refractive index areas are located is expressed as "6 mm" in Hermann-Mauguin notation or "C6v" in Schoenflies notation.

Thus, a number of modified refractive index areas whose sectional shape in the plane direction is 3 m-symmetrical are located at the lattice points arranged in a 6 mm-symmetrical pattern. As a result, a PBG is created for both the TE-polarized light and the TM-polarized light. The non-uniform cross-sectional shape in the vertical direction makes the PBG for the TM-polarized light larger than in the case where the plane shape is uniform in the vertical direction. The expansion of the PBG for the TM-polarized light creates a section overlapping the PBG for the TE-polarized light or broadens an existing overlapping section. The complete PBG thereby obtained is larger than conventional ones. As a result, there is a higher degree of freedom for designing optical devices using two-dimensional photonic crystals.

In the two-dimensional photonic crystal according to the present invention, it is possible to further expand the complete PBG by providing a cladding member (i.e. a member whose refractive index differs from that of the body) on one or both of the upper and lower sides of the body. Presence of the cladding member on the upper and lower sides of the body flattens the electromagnetic field distribution in the direction perpendicular to the body, thereby increasing the difference between the dielectric band and the air band over the entire distribution of the electromagnetic field. The dielectric band and air band ultimately become the origin of a PBG. The refractive index of the material of the cladding member may be larger or smaller than that of the body. In many cases, the body of the two-dimensional photonic crystal is made of a material whose refractive index is large enough to create a considerable difference in refractive index between the body and the air. Therefore, it is natural to make the cladding member of a material whose refractive index is smaller than that of the body. If the body is made of Si, it is preferable to use $SiO_2$ as the material of the cladding member. This material selection allows the use of a commercial SOI (Silicon On Insulator) substrate, which consists of an Si layer laminated onto an $SiO_2$ layer.

The two-dimensional photonic crystal according to the present invention functions as an optical waveguide device if it is provided with a linear defect of the modified refractive index areas or as an optical resonator device if it is provided with a point-like defect. Providing the optical resonator in the vicinity of the optical waveguide makes the crystal function as an optical multiplexer/demultiplexer. In these optical devices, an energy level (called the "defect level") at which light is allowed to exist within the complete PBG is created only at the linear or point-like defect. A ray of light whose wavelength (or frequency) corresponds to the defect level can be present within the defect. However, neither the TE-nor TM-polarized component of that light can propagate through the two-dimensional photonic crystal outside the defect due to the presence of the complete PBG. Therefore, the light existing within the defect is prevented from leaking into the two-dimensional photonic crystal. Thus, loss of light at the optical waveguide or resonator is suppressed.

The complete PBG will not be created if the sectional shape of the modified refractive index areas on a plane parallel to the body is not 3 m-symmetrical while it unevenly changes along the vertical direction. However, in the case where the sectional shape is not 3 m-symmetrical while it unevenly changes along the vertical direction, the two-dimensional photonic crystal will be advantageous in that: (i) it will have a wide TE-PBG, (ii) the waveguide will have a wide transmission wavelength band, and (iii) the optical resonator will have a large Q-value.

Figure 5:
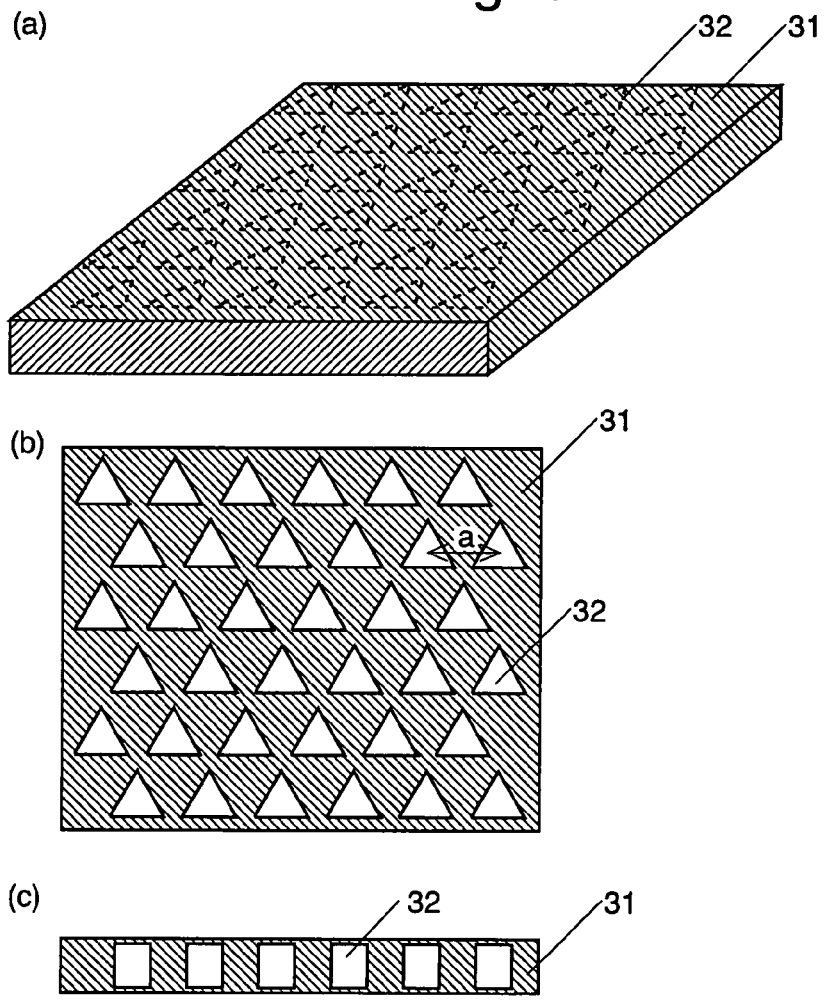
FIG. 5 includes a perspective view (a), a plan view (b) and a cross-sectional view (c) of an embodiment of the two-dimensional photonic crystal according to the present invention.

EMBODIMENTS (1) An Embodiment of the Two-Dimensional Photonic Crystal According to the Present Invention An example of the structure of the two-dimensional photonic crystal according to the present invention is described with reference to FIGS. 5(a) to 5(c), where FIG. 5(a) is a perspective view of the body, FIG. 5(b) is a sectional view of the crystal on a plane parallel to the body, and FIG. 5(c) is a sectional view of the crystal on a plane vertical to the body. The slab-shaped body 31 made of Si or other material is provided with holes 32 arranged with a period of a. The holes 32 are arranged in a triangular lattice pattern, where the triangular lattice points are arranged in a 6 mm-symmetrical pattern. The holes 32 are not observable on the surface of the body because the upper and lower sides of the holes 32 are closed (FIG. 5(c)). The plane shape of each hole 32 is an equilateral triangle, as shown in FIG. 5(b); this shape satisfies the condition of 3 m-symmetry.

(2) Manufacturing Method

Figure 6:
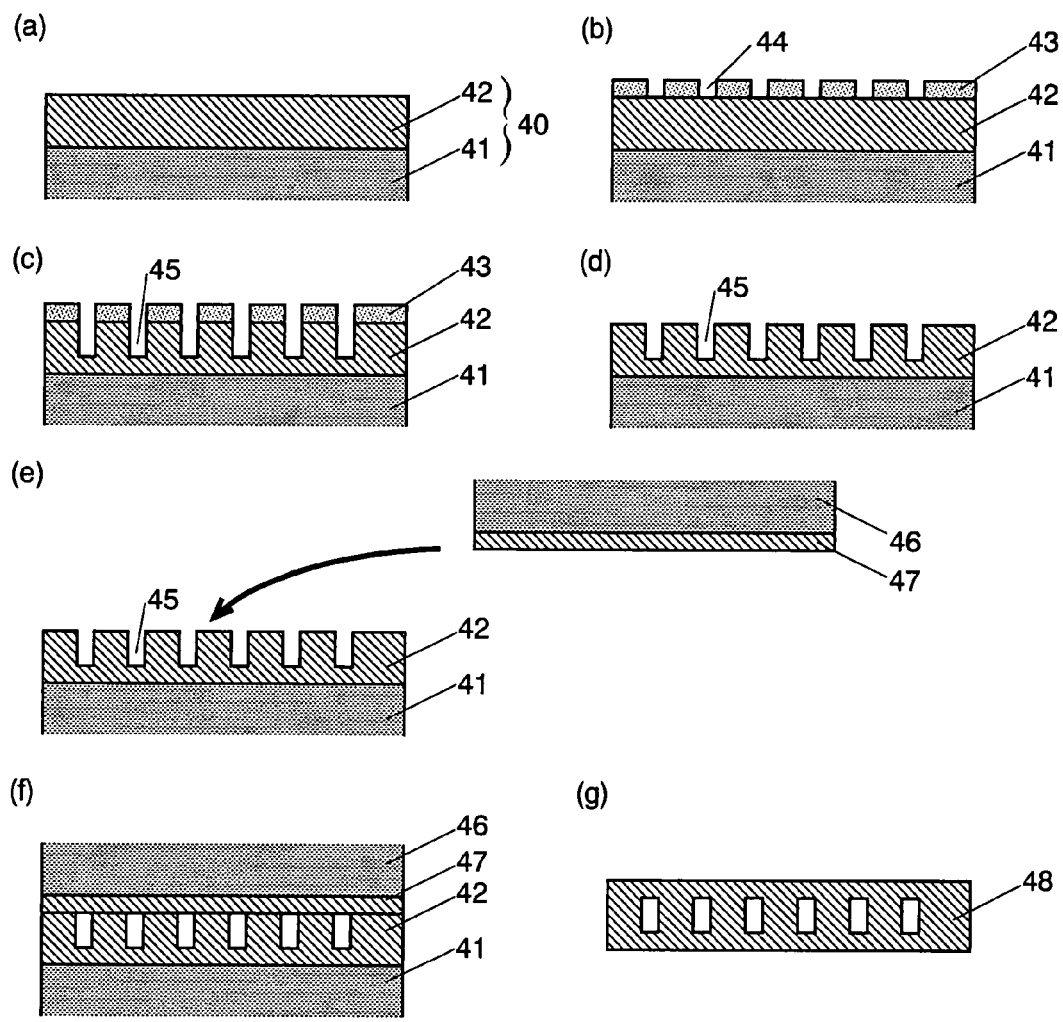
FIG. 6 illustrates the steps of an embodiment of the method for manufacturing a two-dimensional photonic crystal according to the present invention.

With reference to FIG. 6, a method for manufacturing a two-dimensional photonic crystal as shown in FIGS. 5(a) to 5(c) is described.

The method according to the present embodiment uses an SOI substrate 40 consisting of an $SiO_2$ substrate 41 covered with an Si thin film 42 (Step (a)). This film 42 is to be the crystal body. A resist 43 is applied onto the Si thin film 42, and then holes 44 whose plane shape is an equilateral triangle are formed in the resist 43 in a triangular lattice pattern (Step (b)). It should be noted that the triangular shape is not shown in FIG. 6 because FIG. 6 shows the vertical section of the Si thin film 42. The holes 44 can be created by photolithography, electron beam lithography or other techniques commonly used for manufacturing semiconductor devices. Next, the holes 45 shaped like a triangular column are created in the Si thin film 42 by an appropriate method, such as a dry etching process using an etching gas (e.g. $SF_6$ gas) (Step (c)). The period of time for the etching process is controlled so that the boring of the holes 45 is discontinued in the middle of the process to leave a portion of the Si thin film 42 on the side of the hole 44 closer to the substrate 41. Subsequently, the resist is removed (Step (d)), and the Si thin film 42 is laid onto another Si thin film 47 (Step (e)), which has been separately created beforehand on a substrate 46 made of $SiO_2$. Then, the two films are adhered to each other (Step (f)). For example, the adhering process may be a process of fusing the films at a high temperature from 900 to 1100 degrees Celsius. As a result, the two Si thin films 42 and 47 are integrated as one. Finally, the $SiO_2$ substrates 41 and 46 are removed by an appropriate process, such as a wet etching process using an etchant (e.g. aqueous HF solution) (Step (g)). Thus, a two-dimensional photonic crystal 48 according to the present invention is obtained. If cladding members are required as in the case described later, the $SiO_2$ substrates 41 and 46 can be left as the cladding members.

(3) Other Embodiments of the Two-Dimensional Photonic Crystal According to the Present Invention FIGS. 7(a) and 7(b) each show a section of the body on a plane parallel to the body, in which the sectional shape of the holes on the parallel plane is not an equilateral triangle. The sectional shape of the holes on a plane perpendicular to the body is the same as shown in FIG. 5(c). The example of FIG. 7(a) has three holes 54a, 54b and 54c, each being shaped like a circular column, with their centers located at the apexes 53a, 53b and 53c of the equilateral triangle 52, respectively. These three holes integrally function as one modified refractive index area 55. This modified refractive index area consisting of the three holes is 3 m-symmetrical. Such modified refractive index areas 55 are arranged in a triangular lattice pattern. The lattice points at which these modified refractive index areas are located are arranged in a 6 mm-symmetrical pattern. The example in FIG. 7(a) may be modified as in FIG. 7(b), where the three column-like holes 54a, 54b and 54c overlap each other to form a single hole 56. As in the previous example, the holes 56 are arranged in a triangular lattice pattern. Also in the present example, the hole 56 is 3 m-symmetrical and the lattice points at which the holes 56 are located are arranged in a 6 mm-symmetrical pattern.

(4) Complete PBG of the Two-Dimensional Photonic Crystals in the Present Embodiments The width value of the complete PBG (called the "complete PBG value" hereinafter) has been calculated for some of the above-described two-dimensional photonic crystals according to the present embodiment. The results are explained in the following sections. The calculation used a three-dimensional finite difference time domain (FDTD) method. Compared with the plane wave expansion method used in Non-Patent Document 1, the three-dimensional FDTD method is more complex and produces more accurate values. The results also show the values of the PBG for TM-polarized light (called the "TM-PBG" hereinafter) and the PBG for TE-polarized light (called the "TE-PBG" hereinafter). As explained earlier, the complete PBG corresponds to an energy region where the TM-PBG and the TE-PBG overlap each other. In the following calculation results, each PBG value is expressed in a percentage value showing the ratio of the PBG width $\Delta\omega$ to the central value $\omega_0$ of the PBG in terms of frequency.

COMPARATIVE EXAMPLES

For the purpose of comparison, the TM-PBG values and the complete PBG values of some conventional two-dimensional photonic crystals were calculated (FIG. 8). In any cases of (a) to (c) (and also in any of the three calculation examples to be explained later), the body 81 is made of Si. The plane shape of the holes 82 is either (i) an equilateral triangle or (ii) a set of three circles with their centers located at the three apexes of a triangular triangle, respectively. The filling factor $f_{air}$, i.e. the total volume of the holes divided by that of the body, is 0.45 in (i) and 0.58 in (ii). The thickness of the body 81 was 0.8 times as large as the period a of the holes 82. In (a), the body 81 was in contact with air both the upper and lower sides. In (b), the body 81 was in contact with air on the upper side and with a cladding member 83 made of $SiO_2$ on the lower side; the cladding member 83 was much thicker than the body. In (c), the body 81 was in contact with the cladding members 83 on both the upper and lower sides. For each of these constructions, the result of calculation of the TM-PBG value and the complete PBG value is shown in FIG. 8. The result showed that the complete PBG was created only in cases (a)-(i) and (c)-(ii); the values were 0.4% and 1.2%, respectively.

First Calculation Example

The complete PBG value of an example of the two-dimensional photonic crystal according to the present invention was calculated (FIG. 9). In the present case, the two-dimensional photonic crystal had holes 82 whose plane shape was an equilateral triangle and which were closed on both upper and lower sides. The filling factor of the holes 82 was $f_{air}=0.45$. The height of the holes was 0.6 a; the height of the covers on the upper and lower sides of the holes 82 was 0.1 a on both sides. In the constructions (a) to (c) of FIG. 9, each of the upper and lower sides of the body 81 was in contact with either air or a cladding member 83 made of $SiO_2$ in a manner as seen in the constructions (a) to (c) of FIG. 8, respectively.

The calculation showed that the complete PBG value was 2.1% in (a), 2.6% in (b) and 3.1% in (c). Any of these values is larger than those in the comparative examples of FIG. 8. The TM-PBG value was 2.1% in (a), 2.6% in (b) and 3.1% in (c). In the comparative examples of FIG. 8, the TM-PBG is closed in the constructions (b) and (c), whereas the TM-PBG is open in the corresponding constructions of the present example. Therefore, the complete PBG is open only in the present calculation example. With respect to construction (a), the present TM-PBG value is larger than that in the comparative example of FIG. 8, so that the complete PBG is accordingly larger. The present calculation example has also proved that the provision of the cladding member 83 widens the complete PBG.

Second Calculation Example

The complete PBG value of a two-dimensional photonic crystal constructed as shown in FIG. 7(a) was calculated (FIG. 10). In the present example, the plane shape of the holes 82 consisted of three circles whose centers were located at the three apexes of an equilateral rectangle, respectively, and whose upper and lower sides were closed. In (a), the holes and the cover were 0.6 a and 0.1 a (on both upper and lower sides)

in height, respectively. In (b), the holes and the cover were 0.7 a and 0.05 a in height, respectively. In (c), the cladding members 83 made of $SiO_2$ were provided on both upper and lower sides of the construction (b).

The calculation showed that the completed PBG value was 2.0% in (a), 3.5% in (b) and 3.2% in (c). Any of these values is larger than those in the comparative examples. This result shows that, if the thickness of the body is the same (0.8 a in the present case), the complete PBG value changes if the height of the holes is changed. As opposed to the first calculation example, in (a) and (c) of the present case, the complete PBG is smaller than the TM-PBG. This is because only a portion of the TM-PBG overlaps the TE-PBG in the cases of FIGS. 10(*a*) and 10(*c*), whereas the TM-PBG is entirely included in the energy range of the TE-PBG in the cases of the first calculation example and FIG. 10(*b*).

Comparing the results of (a) and (b) in FIG. 10 might suggest that the complete PBG could be further widened by increasing the height of the holes (i.e. decreasing the height of the cover). However, it should be noted that it would ultimately lead to the complete elimination of the covers, as shown in FIG. 8(*a*)-(ii), in which case no complete PBG would be created.

Third Calculation Example

Figure 7:
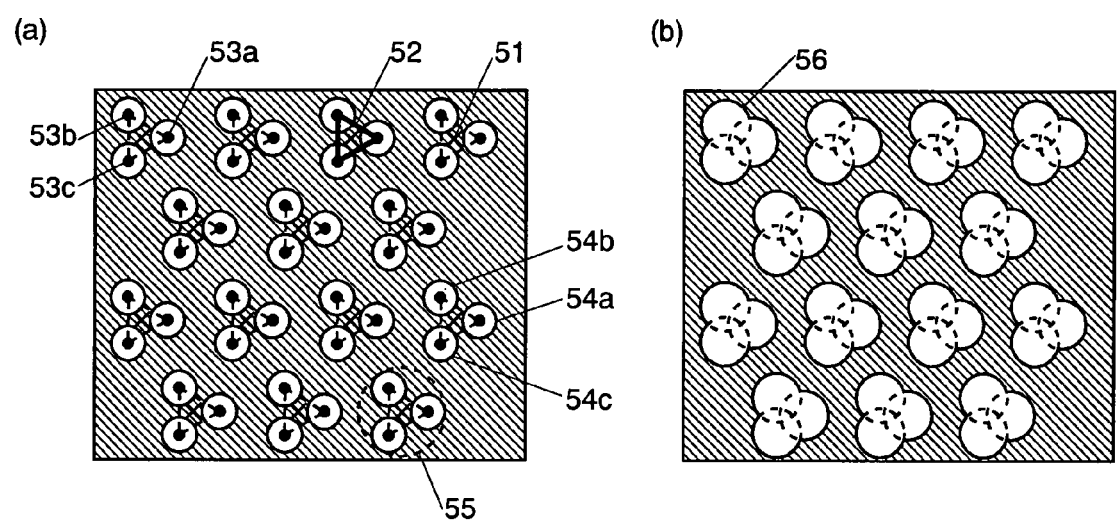
FIGS. 7($a$) and 7($b$) are plan views of other embodiments of the two-dimensional photonic crystal according to the present invention.

The complete PBG of another two-dimensional photonic crystal was calculated (FIG. 11), in which the plane shape of the holes 82 was as shown in FIG. 7(*b*) and only the lower side of the holes was closed. In (a), the height of the holes was 0.75 a, and the height of the cover provided only on the lower side of the holes was 0.05 a. In (b), the cladding member 83 made of $SiO_2$ was provided only on the lower side. The calculation showed that the complete PBG value was 4.4% in (a) and 3.0% in (b). The complete PBG obtained in (a) was larger than any other example.

The invention claimed is:

1. A two-dimensional photonic crystal having a slab-shaped body with a periodic arrangement of modified refractive index areas, which are identically shaped and whose refractive index is different from that of the body, which is characterized in that:
    a pattern of lattice points at which the modified refractive index areas are located is 6 mm-symmetrical; and
    a cross-section of the modified refractive index areas on a plane parallel to the body has a 3 m-symmetrical shape, and both of upper and lower sides of the modified refractive index areas are closed by closing members having a same refractive index as that of the body, wherein the closing members are plate-shaped or film-shaped and have a thickness thinner than a thickness of the body.

2. The two-dimensional photonic crystal according to claim 1, which is characterized in that a boundary line of the cross-section of the modified refractive index area on a plane perpendicular to the body is convex, concave, crank-shaped or linearly inclined on a side facing a perpendicular central line of the modified refractive index area, or a combination of two or more of these shape elements.

3. The two-dimensional photonic crystal according to claim 1, which is characterized in that one or both of upper and lower sides of the body are in contact with a cladding member whose refractive index differs from that of the body.

4. The two-dimensional photonic crystal according to claim 3, which is characterized in that the cladding member is made of a material whose refractive index is higher than that of air and lower than that of the material of the body.

5. The two-dimensional photonic crystal according to claim 4, which is characterized in that the body is made of silicon and the cladding member is made of silicon dioxide.

6. The two-dimensional photonic crystal according to claim 1, which is characterized in that each modified refractive index area is a hole.

7. An optical waveguide device, which is characterized in that it comprises a two-dimensional photonic crystal according to claim 1, in which a linear defect of the modified refractive index areas is created.

8. An optical resonator device, which is characterized in that it comprises a two-dimensional photonic crystal according to claim 1, in which a point-like defect of the modified refractive index areas is created.

9. An optical multiplexer/demultiplexer, which is characterized in that it comprises:
    a two-dimensional photonic crystal according to claim 1;
    at least one optical waveguide including a linear defect of the modified refractive index areas created in the two-dimensional photonic crystal; and
    at least one optical resonator including a point-like defect of the modified refractive index areas created in a vicinity of the optical waveguide.

10. A method for manufacturing a two-dimensional photonic crystal including a slab-shaped body according to claim 1 which includes steps of:
    forming holes in the body, the holes being periodically arranged; and
    adhering the closing members according to claim 1 to the body, the closing member having no holes,
    wherein the closing members include a first closing member and a second closing member, the adhering step comprising:
    adhering the first closing member onto an upper side of the body on which the holes are present, and/or
    adhering the second closing member onto a lower side of the body.

* * * * *